(12) United States Patent
Mies

(10) Patent No.: US 7,146,742 B2
(45) Date of Patent: Dec. 12, 2006

(54) DEVICE FOR RECOGNIZING A PROBE HEAD USED IN A MEASURING INSTRUMENT

(75) Inventor: Georg Mies, Wipperfürth (DE)

(73) Assignee: Klingelnberg GmbH, Hueckeswagen (DE)

( * ) Notice: Subject to any disclaimer, the term of this patent is extended or adjusted under 35 U.S.C. 154(b) by 0 days.

(21) Appl. No.: 11/182,576

(22) Filed: Jul. 15, 2005

(65) Prior Publication Data
US 2006/0016276 A1  Jan. 26, 2006

(30) Foreign Application Priority Data
Jul. 20, 2004  (DE) .................. 20 2004 011 364

(51) Int. Cl.
*G01B 7/00*  (2006.01)
(52) U.S. Cl. .......................................... 33/561; 33/558
(58) Field of Classification Search .................. 33/561
See application file for complete search history.

(56) References Cited

U.S. PATENT DOCUMENTS

| | | | |
|---|---|---|---|
| 4,631,834 A * | 12/1986 | Hayashi et al. ............. 33/503 |
| 5,209,131 A * | 5/1993 | Baxter ...................... 73/865.8 |
| 5,412,880 A * | 5/1995 | Raab ........................... 33/503 |
| 5,526,576 A * | 6/1996 | Fuchs et al. ................. 33/503 |
| 5,755,038 A | 5/1998 | McMurtry |
| 5,953,687 A * | 9/1999 | Zink et al. .................. 702/168 |
| 6,772,527 B1 * | 8/2004 | Butter et al. ................ 33/503 |
| 6,983,547 B1 * | 1/2006 | Fleming et al. ............. 33/503 |
| 6,988,322 B1 * | 1/2006 | Raab et al. .................. 33/503 |

FOREIGN PATENT DOCUMENTS

| | | |
|---|---|---|
| DE | 7400071 U1 | 4/1974 |
| DE | 33 20 127 C2 | 12/1984 |
| DE | 196 23 600 A1 | 1/1997 |
| JP | 58-173425 | 10/1983 |
| WO | WO 87/01798 | 3/1987 |
| WO | WO 03/087708 A1 | 10/2003 |

* cited by examiner

*Primary Examiner*—Christopher W. Fulton
(74) *Attorney, Agent, or Firm*—McCormick, Paulding & Huber LLP

(57) ABSTRACT

Device with a removable probe head (15) for measuring a workpiece, whereby the device comprises a receiving section (17.1) for attaching the probe head (15). In the receiving section (17.1) sensors (17.2) in fixed, predefined positions are arranged. The removable probe head (15) comprises several counterpart elements, which interact with the sensors (17.2) if the probe head (15) is attached to the receiving section (17.1), whereby a coding of the removable probe head (15) can be set in advance, by adjusting the position of the counterpart elements.

11 Claims, 5 Drawing Sheets

DEVICE FOR RECOGNIZING A PROBE HEAD USED IN A MEASURING INSTRUMENT

CROSS REFERENCE TO RELATED APPLICATION

This application claims the benefit of German Application No. DE 20 2004 011 364.3, filed on Jul. 20, 2004, the disclosure of which is herein incorporated by reference in its entirety.

FIELD OF THE INVENTION

The invention concerns devices with removable probe heads and measuring instruments with such devices.

BACKGROUND OF THE INVENTION

There are different devices, like for example measuring instruments, which are equipped with a replaceable probe head.

An embodiment of a conventional measuring instrument comprises a probe head, which can be connected by means of spring action with a probe system.

There are also examples of probe heads, which are fastened by means of permanent magnets to a probe system of a measuring instrument. An appropriate example is described in the German utility model DE-GM 7400071.

A further measuring instrument is presented in the U.S. patent specification U.S. Pat. No. 5,755,038. This special measuring instrument is characterised by the fact that it provides a probe head, which is connected to a probe system by permanent magnets. A similar approach is described in the PCT application WO 03/087708.

A further example of a measuring instrument with replaceable probe head is to be inferred from the German patent specification DE 3320127 C2. There a measuring instrument is described, whose probe head is fastened by means of a combination of a permanent magnet and an electromagnet.

The replaceable probe heads should be as fast and uncomplicatedly removable as possible. In addition, it is important that a measuring instrument is able to differentiate different probe heads from each other, since for example depending upon the kind of the actually used probe head other parameters find application during the evaluation of measuring signals. It is also conceivable that dependent on the form and/or size of the probe head other approaching paths and courses of motion of the probe head are used.

SUMMARY OF THE INVENTION

It is therefore an object of the invention to provide an approach which enables a device to recognize which probe head is currently installed.

A further object of the invention is to provide an approach for a simple and safe recognition of a probe head used.

According to the invention this object is achieved in that a device with removable probe head is provided for measuring a workpiece, which exhibits a receiving section for coupling the probe head. In the receiving section several sensors are arranged in fixed, predefined positions and the removable probe head comprises several counterpart elements, which interact with the sensors if the probe head is coupled to the receiving section. It is given in advance a coding of the removable probe head, in that the position of the counterpart elements is mechanically adjusted, for example by an adjustable mechanism.

According to the invention this object is achieved in that a measuring instrument with several removable probe heads is made available for measuring a workpiece. The measuring instrument exhibits a probe system with a receiving section for attaching one of the probe heads. In the receiving section several sensors are arranged in fixed, predefined positions. Each of the several removable probe heads comprises counterpart elements, which interact with the sensors if the one probe head is coupled to the receiving section. It is given in advance a coding of the several removable probe heads, in that on each of the several removable probe heads the position of the counterpart elements is adjustable.

BRIEF DESCRIPTION OF THE DRAWINGS

Embodiments of the invention are described in more detail in the following by making reference to the drawings.

DESCRIPTION OF THE PREFERRED EMBODIMENTS

In connection with the present description terms are used, which find use also in relevant publications and patents. It is however to be remarked that the use of these terms shall only serve for a better understanding. The gist of the invention and the scope of protection of the claims are not to be limited in the interpretation by the specific choice of the terms. The invention can be transferred easily to other systems of concepts and/or fields. In other fields the terms are to be used in an analogous manner.

Figure 1A:
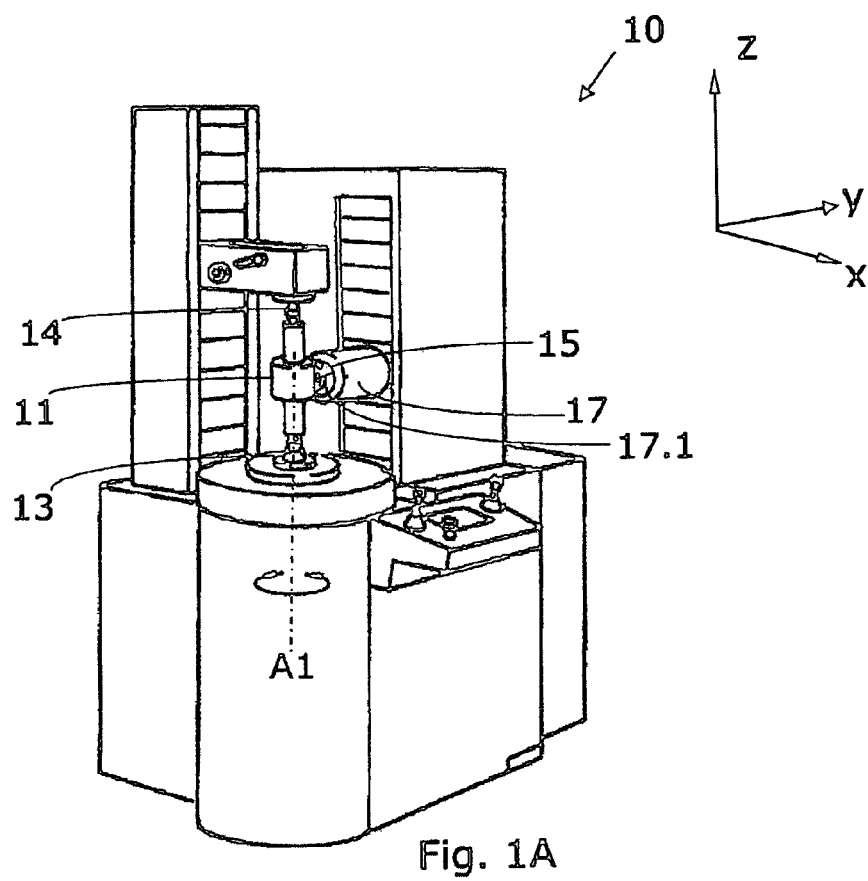
FIG. 1A shows a first measuring instrument, in accordance with the invention, in a perspective view.
Figure 1B:
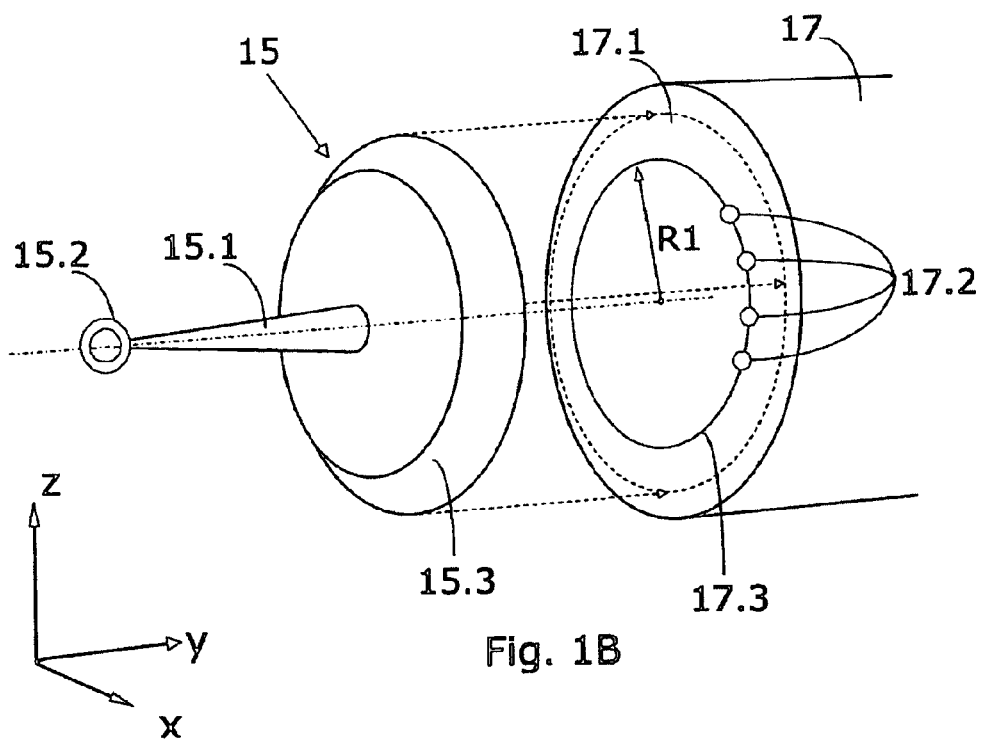
FIG. 1B is a partial view of the first measuring instrument, in accordance with the invention, in a perspective, strongly schematised view.

A first device 10 in accordance with the invention is shown in the FIGS. 1A and 1B. The device 10 shown in FIG. 1A is a fully automatic, CNC-controlled gear-tooth measuring instrument 10. The gear-tooth measuring instrument 10 is suited for examining workpieces 11, as for example spur gear teeth as well as cutting and shaving wheels, worms and worm gears, hobs, bevel gears and general measure–, form and position deviations at rotationally symmetric workpieces, for the circle and cam shaft measurement or also for rotor measurement, in order to enumerate some application types only.

The gear-tooth measuring instrument 10 comprises a driveable coupling part 13 propelable by a controller 12 and a centering means 14, whereby the driveable coupling part 13 and the centering means 14 are arranged such that a rotationally symmetric precision part 11 (workpiece) to be measured is coaxially clampable between driveable coupling part 13 and centering means 14, as shown in FIG. 1A on the basis a spur gear 11.

The gear-tooth measuring instrument 10 comprises, as shown in FIG. 1B, at least one probe head 15, which is equipped for three-dimensional measuring of the precision part 11 mounted in the gear-tooth measuring instrument 10 with a stylus 15.1, 15.2 (for example a three-coordinate probe system). Preferably, a probe system 17 is provided, which can be shifted in the height parallel to the coordinate axis z. In addition, the probe head 15 can perform further approaching movements in the direction of the coordinate axes x and y which stand perpendicularly to each other, whereby an appropriate (CNC) control is provided. The probe head 15 is removable and is laid out for the measuring of a workpiece 11. The gear-tooth measuring instrument 10 comprises a receiving section 17.1 at the probe system 17 for attaching the probe head 15, as indicated: by arrows: In the receiving section 17.1 n=4 sensors 17.2 are arranged at fixed, predefined positions. Generally, it applies that in accordance with the invention n is an integer equal to or greater than two. The removable probe head 15 comprises m counterpart elements, which are covered in FIG. 1B, since they sit on the back of a (change-)plate 15.3 of the probe head 15. The m counterpart elements interact with the n sensors 17.2 if the probe head 15 is coupled to the receiving section 17.1. In accordance with the invention a coding can be set at the removable probe head 15, in that the position of the n counterpart elements is mechanically adjusted by an adjustable mechanism.

Figure 2A:
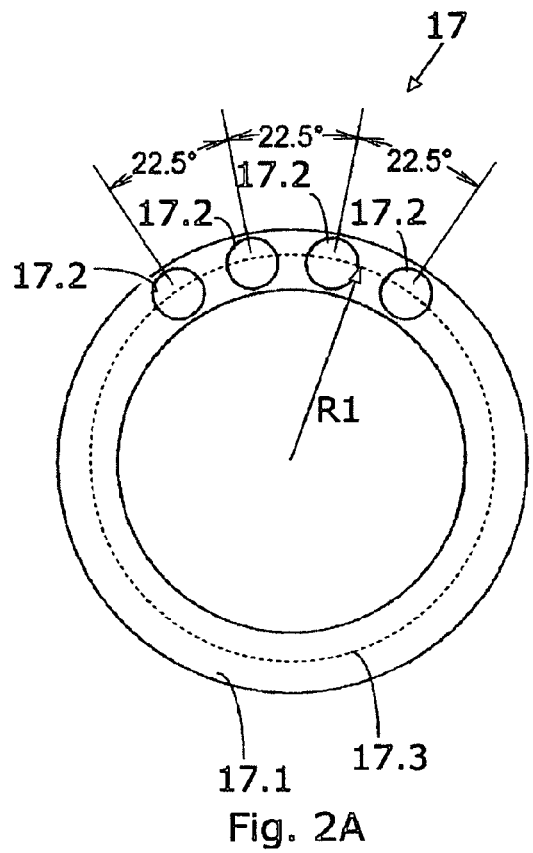
FIG. 2A is a cross-sectional view of a receiving section of a probe system, in accordance with the invention.

Details for this are now described in connection with a further embodiment. In the FIGS. 2A to 2C different views of a probe system 17 with a receiving section 17.1 for attaching a probe head 15 are shown. FIG. 2A is a cross-section in the x-z-plane. The cross-section runs closely underneath the surface of the probe system 17, in order to be able to show the n=4 sensors 17.2, which are hidden in the section 17.7 behind a thin surface in the probe system 17 of the current embodiment, as one can recognize by means of the top view in FIG. 2C. In the embodiment shown the n=4 sensors 17.2 lie on a circular arc segment 17.3, which has a radius R1. Between the n sensors 17.2 there is an angular distance β1, respectively, which is in the present case 22.5°.

Figure 2B:
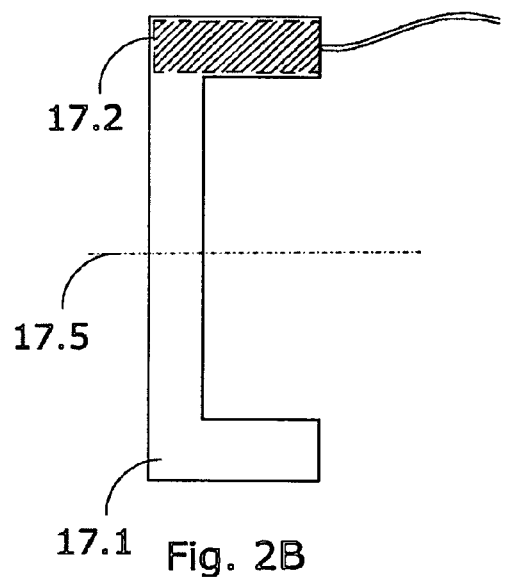
FIG. 2B is a cross-sectional view of the probe system in accordance with Fig. 2A.
Figure 2C:
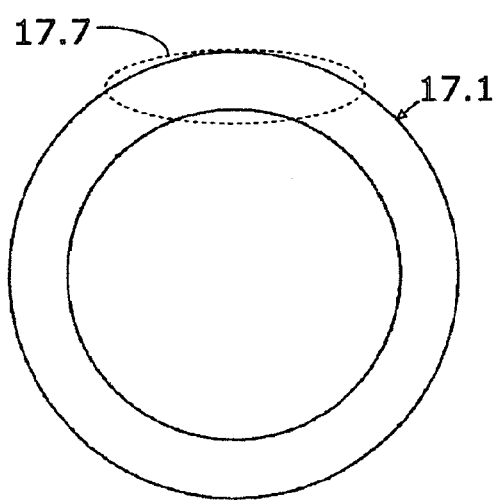
FIG. 2C is a top view of the probe system in accordance with FIG. 2A.

In the sectional view in FIG. 2B one can recognize a cut through one of the sensors 17.2. The sensor 17.2 sits, as already described, right underneath the surface of the probe system 17. Thus the sensors are mechanically protected 17.2. In addition, a smooth surface results, which can easily be cleaned. Several sensors 17.2 together can form a structural unit.

Figure 3A:
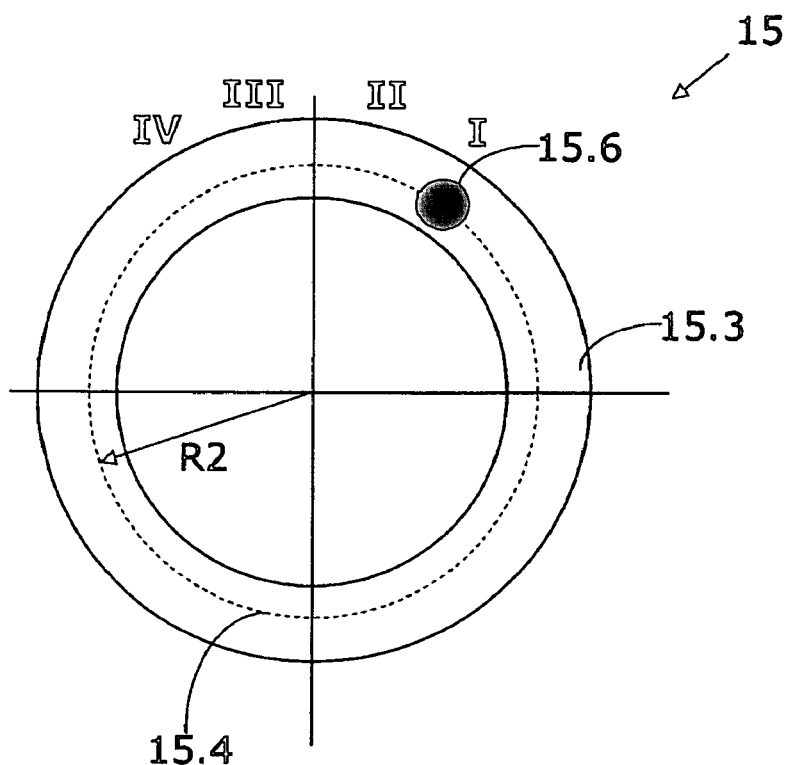
FIG. 3A is a schematic back view of a probe head, which is installed in the receiving section of a probe system, whereby at the probe in accordance with the invention a first coding is adjusted.

In the FIGS. 3A to 3D back views of a probe 15 are shown in schematic form. In the embodiment shown, the probe 15 comprises m=1 counterpart elements 15.6. In the FIGS. 3A to 3D the positions of the sensors 17.2 are indicated by the Roman numbers I, II, III and IV. In FIG. 3A the coding of the probe 15 is adjusted so that a counterpart element 15.6 comes to lie in front of the sensor 17.2 present at position I of the probe system 17, if the probe 15 is installed at the receiving section 17.1. Since the counterpart element 15.6 is directly next to the sensor 17.2 on position I, the sensor 17.2 can recognize the presence.

In accordance with the invention, the sensors 17.2 and counterpart elements 15.6 are selected in such a way that an inteaction between the two results. Preferably, a magnetic field sensor (Reed switch) is used as sensor 17.2 and a magnet as counterpart element 15.6. Other active or passive pairs of sensors/counterpart elements can be employed, which work for example optically, capacitively or inductively. When chosing the sensors and counterpart elements it is important that the entire structure is to work as simply and troublefree as possible.

An evaluation unit of the device 10 can evaluate each of the n sensors 17.2, in order to determine from this a statement about the coding. In FIG. 3A the sensor 17.2 on the position I would give a signal, while the other sensors 17.2 would supply no signal, or substantially weaker signals. Transferred into a binary system, the position shown in FIG. 3A corresponds to the number of 0001.

Figure 3B:
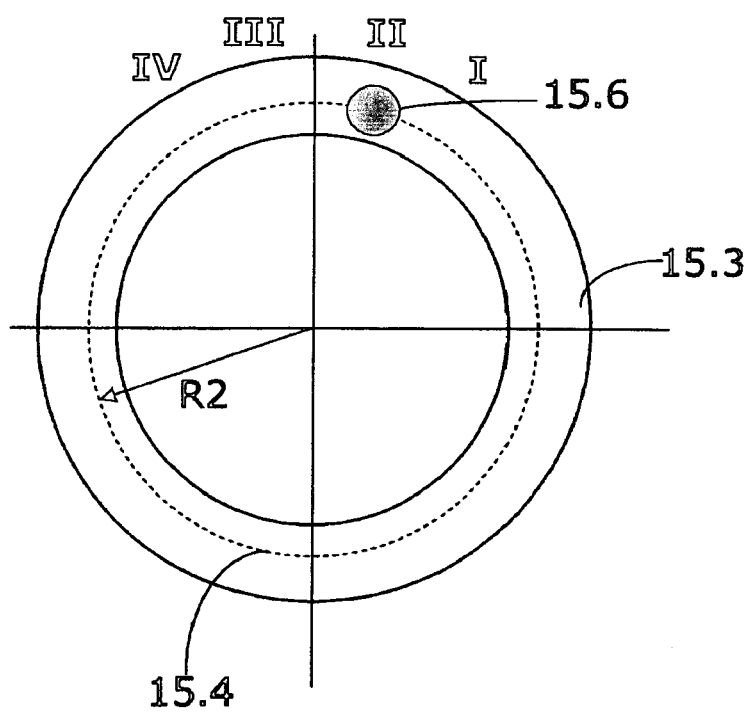
FIG. 3B is a schematic back view of the probe of FIG. 3A, whereby at the probe in accordance with the invention a second coding is adjusted.

Another probe head 15 is coded in such a way that the counterpart element 15.6 sits on the position II, as shown in FIG. 3B. In FIG. 3B the sensor 17.2 on the position II would give a signal, while the other sensors 17.2 would provide no signal, or substantially weaker signals. Transferred into a binary system, the position shown in FIG. 3B corresponds to the number 0010.

Figure 3C:
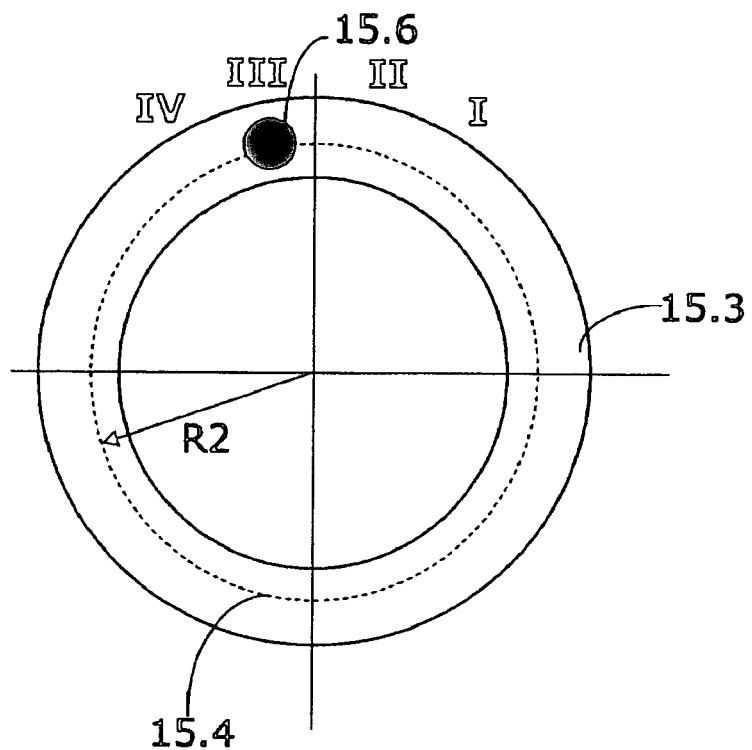
FIG. 3C is a schematic back view of the probe in FIG. 3A, whereby at the probe in accordance with the invention a third coding is adjusted.

A further probe head 15 is coded in such a way that the counterpart element 15.6 sits on the position III, as shown in FIG. 3C. In FIG. 3C the sensor 17.2 on the position III would give a signal, while the other sensors 17.2 provide no signal, or substantially weaker signals. Transferred into a binary system, the position shown in FIG. 3C corresponds to the number 0100.

Figure 3D:
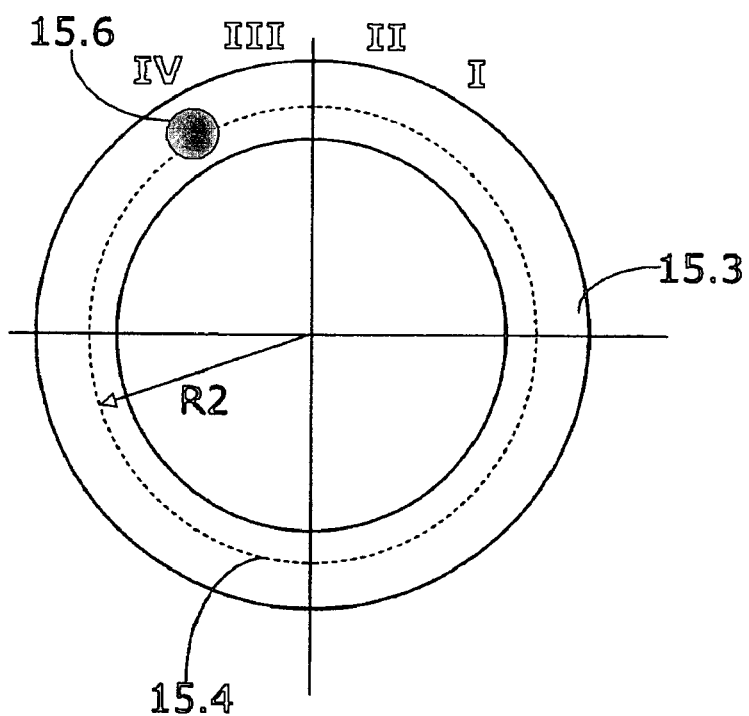
FIG. 3D is a schematic back view of the probe of FIG. 3A, whereby at the probe in accordance with the invention a fourth coding is adjusted.

Still a further probe head 15 is coded in such a way that the counterpart element 15.6 sits on the position IV, as shown in FIG. 3D. In FIG. 3D the sensor 17.2 on the position IV would give a signal, while the other sensors 17.2 provide no signal, or substantially weaker signals. Transferred into a binary system, the position shown in FIG. 3D corresponds to the number 1000.

If no probe head 15 is present, or if the coding were made in such a way that the counterpart element 15.6 sits on a position, which does not match with one of the sensors 17.2, then the evaluation unit can conclude that no probe head 15 is attached. However, one can program the evaluation unit in such a way that the signal 0000 is rated in such a way, as if a "wrong" or incorrect probe head 15 would have be installed.

It is obvious that dependent on the integer numbers n and m several different variants are possible, whereby those solutions are preferred, which for cost- and/or space reasons get along with as few sensors as possible.

An embodiment turned out to be particularly favourably where n=4 sensors 17.2 and m=8 counterpart elements 15.6 are being deployed. In this case $2^n$ different probe heads 15 can be differentiated, as evident from the FIGS. 4A to 4P. In accordance with this preferred embodiment, sixteen different positions are defined on a circular arc 15.4 with radius R2, which have in each case an angular distance β2, which amounts to 22.5°. I.e., it applies that R2≈R1 and β2≈β1. At eight of the total number of sixteen different angle positions there are counterpart elements 15.6, which are shown as black circles in the FIGS. 4A to 4P. By this special arrangement one obtains a binary word with 4 bits, which can be read out and processed directly. In each of the FIGS. 4A to 4P one sees another probe head, which differs by a corresponding adjustment of a rotatable disk or a rotatable ring. The rotatable disks lie in the illustrations shown in the paper plane and sit co-axially on the probe system 17. The n=4 sensors 17.2 of the probe system 17 are indicated by four open circles. The position of the sensor 17.2 is not changed, but the coding arises as a result of mechanically changing (rotating, shifting, re-configuring) of the probe heads 15.

Figure 4A:
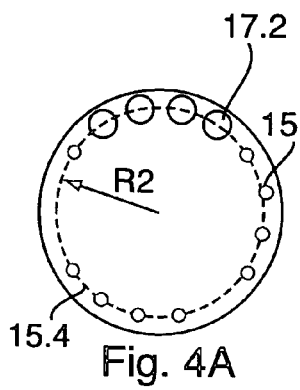
FIG. 4A–4P are different schematic side views of a probe head, which is installed in the receiving section of a probe system, whereby in each of the figures at the probe in accordance with the invention another coding is adjusted.
Figure 4B:
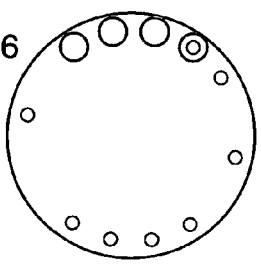
Figure 4C:
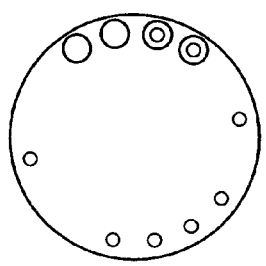
Figure 4D:
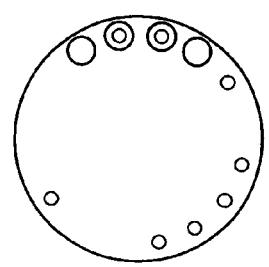
Figure 4E:
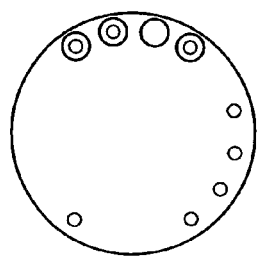
Figure 4F:
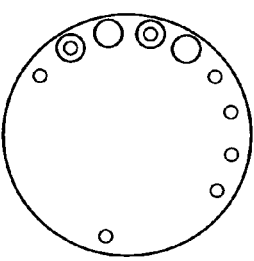
Figure 4G:
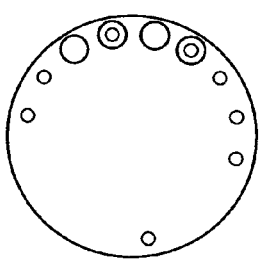
Figure 4H:
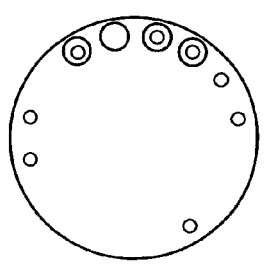
Figure 4I:
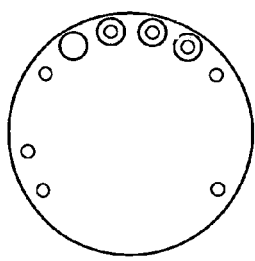
Figure 4J:
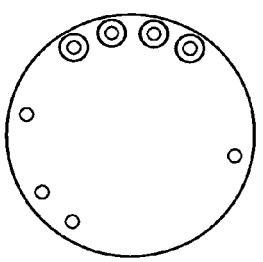
Figure 4K:
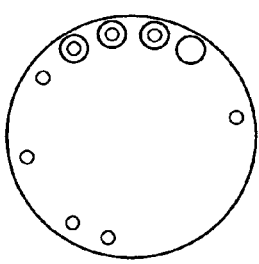
Figure 4L:
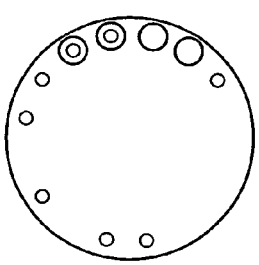
Figure 4M:
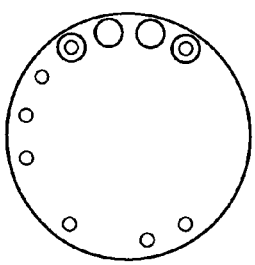
Figure 4N:
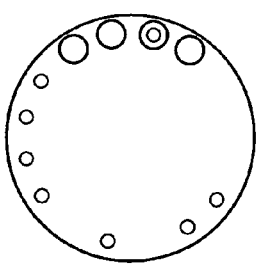
Figure 4O:
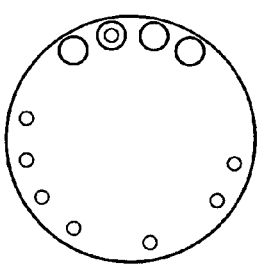
Figure 4P:
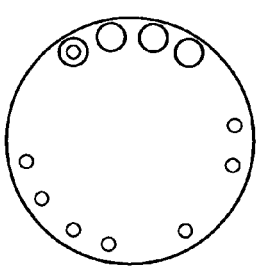

In FIG. 4A a probe head 15 is shown, whose counterpart elements 15.6 are set by adjusting the swivelling disk or a rotatable ring so that, when mounting the probe head 15 at the probe system 17, none comes to lie in front of one of the n=4 sensors 17.2. This corresponds to 0000 in binary expression. In FIG. 4B now a probe head 15 is shown, whose counterpart elements 15.6 are set by adjusting the swivelling disk or a rotatable ring so that, when mounting the probe head 15 at the probe system 17, one of the counterpart elements 15.6 comes to lie before one of the n=4 sensors 17.2. This corresponds to 0001 in binary expression. In FIG. 4C now a probe head 15 is shown, whose counterpart elements 15.6 are set by adjusting the swivelling disk or a rotatable ring that, when mounting the probe head 15 on the probe system 17, two the counterpart elements 15.6 come to lie before two of the n=4 sensors 17.2. This corresponds to 0011 in binary expression.

For the sake of the better clarity the different codings are together outlined in a table.

| Figure | Coding | Probe head number |
|--------|--------|-------------------|
| 4A | 0000 | 0 |
| 4B | 0001 | 1 |
| 4C | 0011 | 2 |
| 4D | 0110 | 3 |
| 4E | 1101 | 4 |
| 4F | 1010 | 5 |
| 4G | 0101 | 6 |
| 4H | 1011 | 7 |
| 4I | 0111 | 8 |
| 4J | 1111 | 9 |
| 4K | 1110 | 10 |
| 4L | 1100 | 11 |
| 4M | 1001 | 12 |
| 4N | 0010 | 13 |
| 4O | 0100 | 14 |
| 4P | 1000 | 15 |

A device 10 according to the invention can be used as follows. At a removable probe head 15 a coding is set by adjusting the position of m counterpart elements. As described, the coding can be set for example by rotating a disk or a ring, which carries the m counterpart elements 15.6 in fixed, predefined positions. However, magnets can also be inserted or screwed into holes, which is referred to as re-configuration.

After the probe head 15 was coded in this way, it can be fastened to the probe system 17. The probe system 17, or the device 10, to which the probe system 17 is fastened, now determines the coding by inquiring the n sensors 17.2, which are arranged in fixed, predefined positions in the receiving section 17.1 for the probe head 15. When determining the coding for example for each of the n sensors 17.2 it is detected whether one of the m counterpart elements 15.6 of the probe head 15 in an interaction range. The coding determined in this way is now compared with a stored coding, whereby in case of a match a recognition of the probe head 15 is possible.

Preferably in the context of an initialisation procedure the device 10 is prepared. This can happen for example, in that for a stored coding information is selected or entered, which characterises a corresponding probe head 15. This can be better described on the basis an example.

If there are ten different probe heads 15 for example, the device 10 must know, which of the ten probe heads is represented by the coding 0000 and which of the ten probe heads 15 by the coding 0001, etc. Preferably, in addition to this information also still other data are given in the context of an initialisation procedure. In this way the type of the probe head 15 can be given for example. It is also possible to provide other defaults, as can be recognized on the basis of the following examples: Sensitivity of the probe head, scanning field, necessary amplification factor, dimension of the probe head (length of the shank 15.1 and size of the scanning ball 15.2) etc.

On the basis these defaults it can for example be ensured that the device 10 performs slower movements with a probe head 15 with thin shank 15.1, in order not to destroy the probe head 15, which because of the thin shank 15.1 is particularly sensitive. In addition, depending upon length of the shank 15.1, size of the ball 15.1 and orientation of the probe head 15 other approaching movements must be made.

Preferably, the adjustable mechanism is implemented as ring or disk, which is co-axially mounted with respect to a longitudinal axis of the probe head 15 and which can be rotated around this axle. Preferably, different grid positions with an angular distance of 22.5° are provided.

In the different embodiments probe heads in the general and tactile probes in particular are being addressed. By the use of the term probe head it is expressed that the invention is not limited to tactile probe systems, but most diverse probe heads can be used.

It is regarded to be a substantial advantage of the invention that it does not need an electrical connection between the probe head and the probe system. In addition, the coding is accomplished easily and there is no need for tools when adjusting the coding.

The invention claimed is:

1. Device with removable probe head for measuring a workpiece, whereby
   the device comprises a receiving section for attaching the probe head,
   in the receiving section n sensors in pre-defined positions are being arranged, whereby n is an integer equal to or greater than two,
   the removable probe head comprises m counterpart elements, whereby m is an integer equal to or greater than one, interacting with the n sensors if the probe head is attached to the receiving section, whereby a coding of the removable probe head can be preset by adjusting the position of the m counterpart elements.

2. Device according to claim 1, whereby the n sensors are arranged at the receiving section on a circular arc segment with a radius R1 and there being an angular distance $\beta 1$ between the n sensors, respectively.

3. Device according to claim 2, whereby the m counterpart elements are arranged at the removable probe head on a circular arc segment with a radius R2 are arranged and there being an angular distance $\beta 2$ between the m counterpart elements, whereby $R2 \approx R1$ and $\beta 2 \approx \beta 1$.

4. Device according to claim 1, whereby the sensors are magnetic field sensors and the counterpart elements magnets.

5. Device according to claim 1, whereby the device comprises an adjustable mechanism in form of a mechanically rotatable means, whereby depending upon the angular position of the rotatable means another coding results from the relative angular position of the n sensors with respect to the m counterpart elements.

6. Device according to claim 5, characterized in that due to the interaction in the device signals result, which represent a binary coding.

7. Device according to claim 6, whereby the binary coding $2^n$ different probe heads can be differentiated.

8. Device according to claim 1, whereby an evaluation unit is provided which evaluates the n sensors in order to determine from it a statement about the coding.

9. Device according to claim 1, whereby the device is a measuring instrument and the probe head is a change plate with stylus for scanning three-dimensional workpieces, as for example gear wheels.

10. Measuring instrument with several removable probe heads for measuring a workpiece, whereby the measuring instrument comprises a probe system with a receiving section for attaching one of the probe heads, at the receiving section n sensors in pre-defined positions are arranged, whereby n is an integer equal to or greater than two, each of the several removable probe heads comprises m counterpart elements, whereby m is an integer equal to or greater than one, interacting with the n sensors if the probe head is attached to the receiving section, whereby a coding of the several removable probe heads can be preset by adjusting on each of the several removable probe heads the position of the m counterpart elements.

11. Measuring instrument according to claim 10, characterized in that it concerns a CNC-controlled gear-tooth measuring instrument for examining workpieces.

* * * * *